(No Model.)
T. H. HICKS.
PNEUMATIC TIRE FOR CYCLES.
No. 483,493. Patented Sept. 27, 1892.
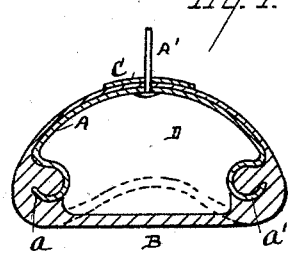
Fig. 1.
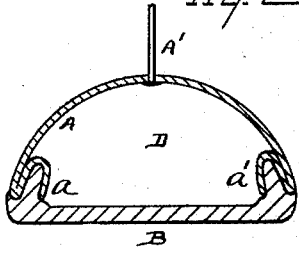
Fig. 2.
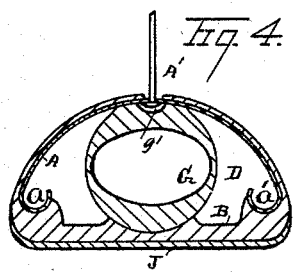
Fig. 4.
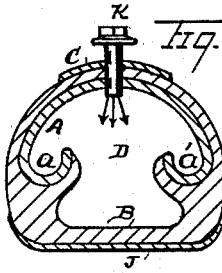
Fig. 3.
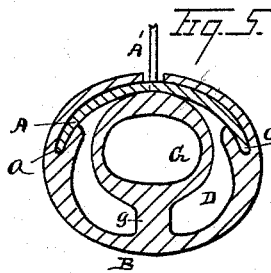
Fig. 5.
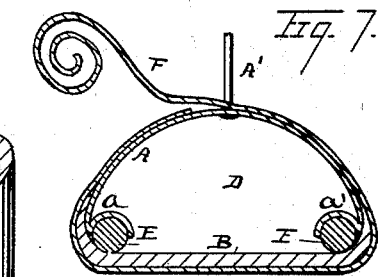
Fig. 9. Fig. 7.
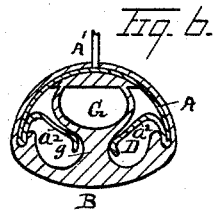
Fig. 6.
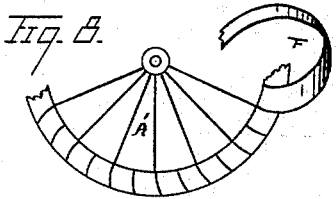
Fig. 8.
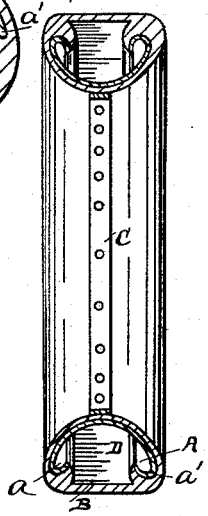
Witnesses
John Schuman.
John F. Miller.
Inventor
Thomas H. Hicks
By his Attorney
Newell S. Wright.

UNITED STATES PATENT OFFICE.

THOMAS H. HICKS, OF DETROIT, MICHIGAN, ASSIGNOR OF ONE-HALF TO GEORGE F. CASE, OF SAME PLACE.

PNEUMATIC TIRE FOR CYCLES.

SPECIFICATION forming part of Letters Patent No. 483,493, dated September 27, 1892.

Application filed April 23, 1892. Serial No. 430,299. (No model.)

*To all whom it may concern:*

Be it known that I, THOMAS H. HICKS, a subject of the Queen of Great Britain, residing at Detroit, county of Wayne, State of Michigan, have invented a certain new and useful Improvement in Pneumatic Tires for Cycling-Wheels; and I declare the following to be a full, clear, and exact description of the same, such as will enable others skilled in the art to which it appertains to make and use the same, reference being had to the accompanying drawings, which form a part of this specification.

My invention relates to certain new and useful improvements in pneumatic tires for cycling-wheels, having for its objects, first, to provide a tire of this class which will permit the construction of wide wheels equipped therewith; second, also to provide a tire having a flat tread; third, to protect the tire at the edges of the flat tread; fourth, to provide a tire for cycling-wheels having an inflatable inner tube; fifth, to render the inflatable inner tube expansible in an air-space formed by an outer tube, and, sixth, to provide such a tire in which the liability of injuring and destroying the efficiency of the inflatable tube shall be overcome.

My invention also relates to the general construction, arrangement, and combination of devices and appliances hereinafter specified and claimed, and illustrated in the accompanying drawings, in which—

Figure 1 is a cross-section of a pneumatic tire, illustrating features of my invention. Figs. 2 and 3 are similar views showing modifications of the construction. Fig. 4 shows a modification in section provided with a separate inner inflatable tube. Figs 5 and 6 show in section other modifications provided with an inner inflatable tube formed integral with the elastic tire-band. Fig. 7 shows in section still another modification and a surrounding wrapper. Fig. 8 is a segmental view illustrating the manner of winding the outer wrapping. Fig. 9 is a separate view showing a segment of the pneumatic tire, the extremities being in section.

The advantage of having wide cycling-wheels for sandy and muddy roads is evident. One difficulty with wheels of this class as they have heretofore been constructed is that they have been made too narrow to permit the rider to stand still thereupon, the difficulty requiring the rider frequently to dismount. Where tires have been used with a circular tread, it has been impracticable to make the wheels have a wide tread. By providing a tire broad enough and flat enough these difficulties may be overcome.

I carry out my invention as follows:

A represents a metallic tire engaged with the spokes A' of a cycling-wheel, said tire preferably dished upon its inner periphery and having two annular outer edges.

B is a tire-band, preferably an elastic band, stretched across the outer periphery of the metallic tire, and engaged in any suitable manner with the edges *a a'* of the metallic wire. The elastic tire-band B may also, if desired, extend around the outer surface of the metal tire. The edges of the elastic tire-band may be brought into proximity along the inner periphery of the tire A, a perforated binding-strip C extending over said edges and engaged therewith, as by cement, to hold them in place and close the seam between said edges. I do not, however, limit myself to the extension of the elastic band B about the outer surface of the tire A, for, as shown in Fig. 2, the elastic tire-band may, within the scope of my invention, be simply stretched across the outer edges *a a'* of the metallic band and secured therewith. This operation of stretching the band B thus across the outer portion of the tire A from edge to edge, it will be seen, both makes the band B taut and also provides a flat tread for the wheel. This construction, furthermore, forms an annular air-chamber D within the tire and tire-band B, said chamber bounded outwardly by the tire-band and inwardly by the metal tire. The air in this air-chamber will obviously react against the inner surface of the elastic band, while also the tire-band has a yielding movement both inward and outward. The pressure of the weight of the rider, however, thereupon will effectually tend to flatten the tread of the tire-band should the air-pressure from within normally extend it outward in circular form. I do not limit myself to any specific manner of engaging the elastic tire-band with the edges of the metal tire to hold the tire-band taut and in place. The drawings illustrate various methods of accomplishing this desired end.

As one of the features of my invention contemplates the protection of the corners or lower lateral edges of the elastic band, I have also shown various ways of accomplishing said result either by thickening the material of the elastic band at said edges or by locating thereat a solid substance, as a solid-rubber ring E. (Shown in Fig. 7.) Over the metallic tire and tire-band may be spirally wound a band of rubber F to strengthen the union of the parts.

G denotes an annular inflatable tube located within the chamber D and expansible therein. This tube may be made thin at the lateral edges and thicker at top and bottom for greater protection thereto, the tube expanding laterally in the air-chamber D. This tube G may either be made integral with the tire-band or separate, as may be desired. If made separate, the tire-band may be formed with a suitable seat to engage the tube and hold it in place, as shown in Fig. 4. If the tube is made integral with the band, it may be supported upon a thickened column $g$. If desired, also, the metal tire may be formed with flexible extremities $a^2$, carried inward to protect and aid in supporting the tube G, as shown in Fig. 6. I would have it understood, however, that I do not confine myself to any specific construction of the metal tire A. The metal tire and the tire-band may be suitably fastened one to the other at their meeting edges, as may be desired. The tube G may, when required, be recessed, as shown at $g'$, to receive the end of the spoke of the wheel, as shown in Fig. 4, the tube at the sides of said recess seating against the tire A. A wheel of any desired width of tread may thus be constructed. Only the hind wheel need ordinarily be made wide with a flat tread, the front wheel being made narrower, if desired. By such a construction a pneumatic tire may be constructed with a less amount of rubber, as a pneumatic tire may be made within the principle of my invention by simply stretching a tire-band across the metal tire from edge to edge.

As shown in Fig. 3, an outer elastic band J may be employed to protect the tire-band, said band J located upon the outer face of the tread. It will be perceived that perforations through the tire-band into the air-chamber D will not injure the reacting elasticity of said tire-band, inasmuch as its elasticity depends upon the lateral tension of the band across the edges of the tire. It will be evident that in passing over any uneven surface, as over a stone, for example, the tire-band will yield inward thereto. The construction is thus adapted to prevent the slipping of the wheel. The dotted line in Fig. 1 illustrates the action upon the tire-band in passing over such an obstruction.

In Fig. 3, K denotes a tube to fill the chamber D with air when an inner tube G is not employed. Such inflation of the chamber D may also be employed in the construction shown in Figs. 1, 2, 7, and 9, Fig. 9 being a segment of a wheel of which Fig. 3 is a cross-section. The inflation of the chamber D may or may not be employed in the construction shown in Figs. 4, 5, and 6. The tubes G are inflated in the usual manner.

What I claim as my invention is—

1. In a cycling-wheel, the combination, with a metal tire dished upon its periphery and having two annular marginal edges, of a tire-band stretched over the outer edges of said tire and across the dished face thereof, forming a flattened tread, and an inner annular air-chamber between said metal tire and the tire-band, said chamber bounded outwardly by said tire-band and inwardly by the metal tire, substantially as described.

2. In a cycling-wheel, the combination, with a metal tire dished upon its periphery and having two annular marginal edges, of an elastic tire-band stretched over the outer edges of said tire and across the dished face thereof, forming a flattened tread, said tire-band extended about the outer surface of said tire and forming an inner annular air-chamber therebetween, said chamber bounded outwardly by said tire-band and inwardly by the metal tire, substantially as described.

3. In a cycling-wheel, the combination, with a metal tire dished upon its periphery and having two annular marginal edges, of an elastic tire-band stretched over the outer edges of the tire and across the dished face thereof, forming the tread of the wheel, and an inner annular air-chamber therebetween, said chamber bounded outwardly by said tire-band and inwardly by the metal tire, said tire-band strengthened at the lateral edges of the tread, substantially as described.

4. In a cycling-wheel, the combination, with a metal tire dished upon its periphery and having two annular marginal edges, of a tire-band stretched across the outer edges of the tire, forming the tread of the wheel, and an inner annular air-chamber bounded outwardly by said tire-band and inwardly by the metal tire, and an inflatable tube located in said air-chamber, substantially as described.

5. In a cycling-wheel, the combination, with a metal tire dished upon its periphery and having two annular marginal edges, of a tire-band stretched across the outer edges of said tire, forming the tread of the wheel, and an inner air-chamber bounded outwardly by said tire-band and inwardly by the metal tire, said tire-band stretched about the tire, and a binding-strip located over the adjacent edges of said band, substantially as described.

6. In a cycling-wheel, the combination, with a metal tire dished upon its periphery and having two annular marginal edges, of a tire-band stretched across the outer edges of said tire, forming the tread of the wheel, and an inner air-chamber bounded outwardly by said tire-band and inwardly by the metal tire, and an inflatable tube located in said air-chamber, said tube recessed at its upper edge to receive the ends of the spokes of the wheel, substantially as described.

7. In a cycling-wheel, the combination, with a metal tire dished upon its periphery and having two annular marginal edges, of a tire-band engaged with the outer edges of the tire, forming the tread of the wheel, and an inner annular air-chamber bounded outwardly by said tire-band and inwardly by the metal tire, and an inflatable tube located in said air-chamber, said tube thickened at top and bottom and made thinner at the sides thereof, substantially as described.

8. In a cycling-wheel, the combination, with a metal tire dished upon its periphery and having two annular marginal edges, of a tire, band engaged with the outer edges of the tire forming the tread of the wheel, and an inner annular air-chamber bounded outwardly by said tire-band and inwardly by the metal tire, and an inflatable tube located within said air-chamber, said tube having an air-space on either side thereof, substantially as described.

9. In a cycling-wheel, the combination, with a metal tire, of a tire-band stretched across the outer portion of the tire, forming the tread of the wheel, and an air-chamber and an inflatable tube located in said air-chamber, the edges of said tire extended into proximity to said inflatable tube to protect the tube, substantially as described.

10. In a cycling-wheel, the combination, with a metal tire, of a tire-band stretched across the outer edges of the tire, forming the tread of the wheel, and an air-chamber and a covering located about the tire and tire-band, substantially as described.

11. In a cycling-wheel, the combination of a metal tire dished upon its periphery and having two annular marginal edges, a tire-band forming an inner annular air-chamber bounded outwardly by said tire and inwardly by the metal tire, and an inflatable tube located in said chamber, said tube supported in said chamber by a thickened column, substantially as described.

12. In a cycling-wheel, the combination of a metal tire, a tire-band stretched across the outer edges of the tire, forming an inner air-chamber and the tread of the wheel, and an outer elastic band J, located upon the outer face of the tread, substantially as described.

In testimony whereof I sign this specification in the presence of two witnesses.

THOMAS H. HICKS.

Witnesses:
N. S. WRIGHT,
JOHN F. MILLER.